April 26, 1960 G. D. FERGUSON 2,934,105
BITS AND SHANKS FOR INSERTED TOOTH SAW
Filed Feb. 6, 1958 2 Sheets-Sheet 1

INVENTOR.
GEORGE D. FERGUSON
BY
ATTORNEYS

April 26, 1960     G. D. FERGUSON     2,934,105
BITS AND SHANKS FOR INSERTED TOOTH SAW
Filed Feb. 6, 1958     2 Sheets-Sheet 2
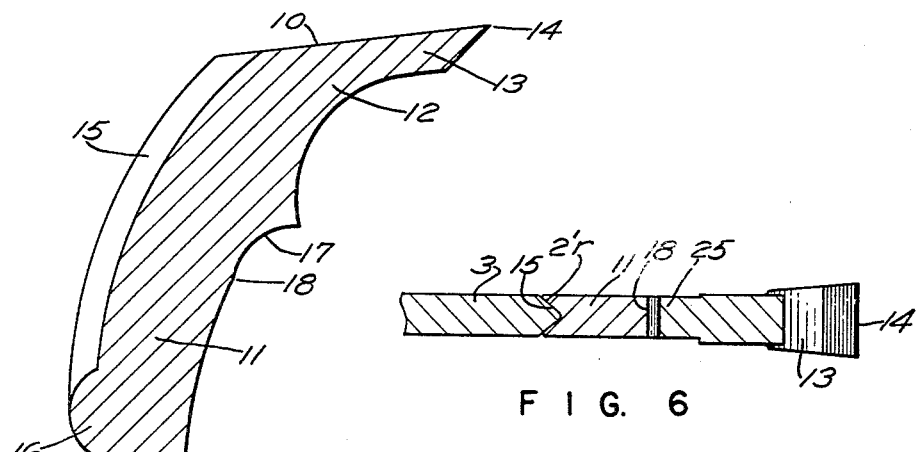
FIG. 5
FIG. 6
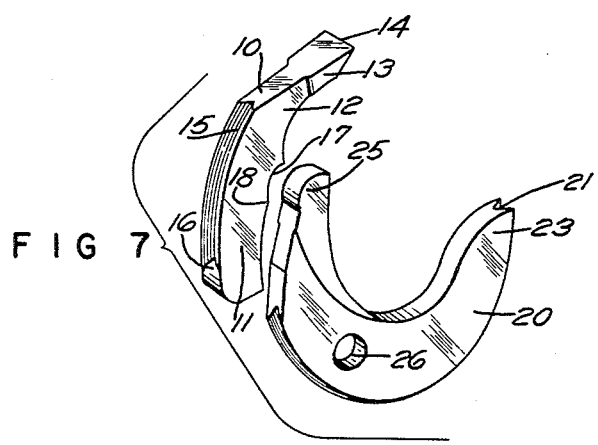
FIG 7
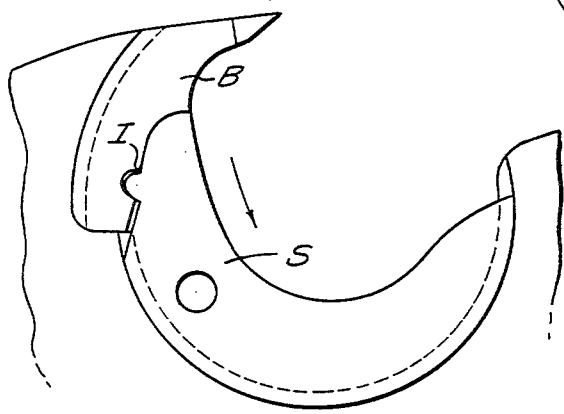
FIG. 8
INVENTOR.
GEORGE D. FERGUSON
ATTORNEYS

United States Patent Office 2,934,105
Patented Apr. 26, 1960

2,934,105

BITS AND SHANKS FOR INSERTED TOOTH SAW

George D. Ferguson, Verdun, Quebec, Canada, assignor to Simonds Saw and Steel Company, Fitchburg, Mass., a corporation of Massachusetts Application February 6, 1958, Serial No. 713,664

3 Claims. (Cl. 143—151)

This invention concerns saws of the inserted tooth class. While saws of this class are usually of the circular type, the invention is applicable also to other inserted tooth saws.

Under the invention a simplified and otherwise improved structure is provided particularly for the bits, together with a novel structural interrelation and manner of coaction of the bits and shanks of each insert pair with each other and with the sockets of the saw plate or blade in which they are to be installed. At the same time the invention aims to afford secure anchorage and firm backing for the inserted bits yet to facilitate insertion and removal thereof as desired, while reducing to a minimum any need for material alteration of the bit and shank sockets of existing standard commercial saw plates or blades, as for example in those circular saws known in the industry as the "Simonds Inserted Tooth Head Saws."

In the drawings illustrating by way of example one embodiment of the invention:

Fig. 1 is a side elevation of sufficient of the marginal portion of a circular saw to illustrate several insert-receiving sockets with the bit and shank insert pairs of the invention installed in two of them and omitted in a third;

Figs. 2, 3 and 4 are a series of side elevational views showing steps in the installation of an insert pair and wherein Fig. 2 shows a bit in place and a shank at an initial step of insertion, Fig. 3 shows an intermediate and maximum on-center stage of the shank relative to the bit, and Fig. 4 shows the pair fully inserted, a small area of the saw plate being broken away in Figs. 2 and 4 for clarity with respect to a locking feature;

Fig. 5 is a section on a medial plane flatwise through one insert tooth or bit seen separately;

Fig. 6 is a section as on the line 6—6 of Fig. 4;

Fig. 7 is an exploded perspective view of an insert pair separately; and

Fig. 8 shows a prior construction on which the invention improves.

Figure 1:
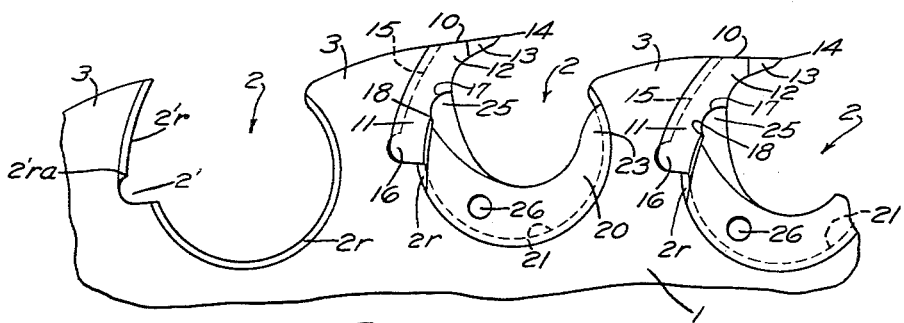

Referring to the drawings in more detail, the saw plate as a whole is designated generally at 1. The marginal portion of the saw plate 1 in Fig. 1 includes several equally spaced sockets 2 in which the insert pairs of tooth bis 10 and shanks 20 of the invention are adapted for installation. The solid portions of the saw plate 1 between adjacent sockets 2 provide abutments or tooth bodies 3 at which the bits 10 furnish the cutter elements.

The tooth bits 10 are elongate generally arcuate metal pieces each comprising a leg 11 and a head 12 extending generally circumferentially of the saw with the forward portion terminating in a cutter tip 13. This may be formed in any usual or preferred manner as by hardening and tempering the bit tip or by making the bit of high-speed steel or by furnishing it with an inlay or insert of hard wear-resistant material such as tungsten-cobalt alloy or the like at the tip 13. These bits tips 13 may be filed, swedged, ground or otherwise appropriately fabricated to present a transverse chisel-like cutting edge as at 14, see particularly Figs. 6 and 7.

Noting Figs. 5 and 7 as well as the others, the rear wall of the leg 11 of each bit 10 has a central V-shaped groove 15 extending from the bit head 12 to a position near the bottom of the leg 11. There the groove 15 terminates in a solid abutment or boss 16 merging with the bottom of the leg. As shown it is inclined or rounded forwardly and upwardly along the leg, so as to extend down into the adjacent end of the groove 15, there presenting an abuttive transverse terminal wall for the groove.

For the purposes of illustration the insert pairs 10, 20 and the saw plate sockets 2 are shown of the separate circular type wherein a major portion of each socket, that which receives the shank 20, is formed upon one circle centered inwardly from the saw plate periphery and a lesser rear portion 2′ of the socket, to receive the bit 10, is formed on a larger circle concentric with the first; see Fig. 1, at left therein. As will be evident from the further description the invention is applicable also to inserted tooth saws wherein the socket portions for the shank and for the bit are made on the same circle. In either case the defining margin of the socket as a whole is provided with a circumferential V-shaped rib formation 2r, transversely central of the saw plate, and to which the V-groove 15 of the bit and the corresponding peripheral V-groove 21 of the shank 20 conform.

In the illustrated embodiment that portion 2′r of the V-rib at the bit-receiving seat 2′ of the socket extends from the outer edge of the saw plate 1 substantially down toward the bottom of said bit seat 2′ and ends in a downwardly facing abutment or shoulder 2′ra distinctly spaced above the bottom wall of said bit seat 2′.

While in some standard saw plates the rib 2′r at the bit seat may extend more or less fully down to and merge with the bottom wall of the bit seat, in a majority of instances it is the practice, for greater ease in manufacture, to terminate the rib at a level spaced above the bottom wall of the bit seat substantially as herein shown in Figs. 1 to 4. In any existing saw plates having bit seats with the V-rib therein continuous to the bottom of the seat the lower inner portion of the rib is in accordance with the invention cut or ground away to provide the downwardly and inwardly facing shoulder or abutment 2′ra substantially as herein shown.

This is the only structural modification of the saw plate itself necessary for the practice of the present invention. It is readily accomplished for any existing saws not already constituted with a rib-terminal shoulder or abutment such as 2′ra hereof. It will be understood also that in the case of single-circle insert pairs the usual continuous circumferential V-rib of the socket is interruptively cut away at the location corresponding to that of the bit boss 16 so as to there present an abutment or shoulder for coaction therewith.

Figure 2:
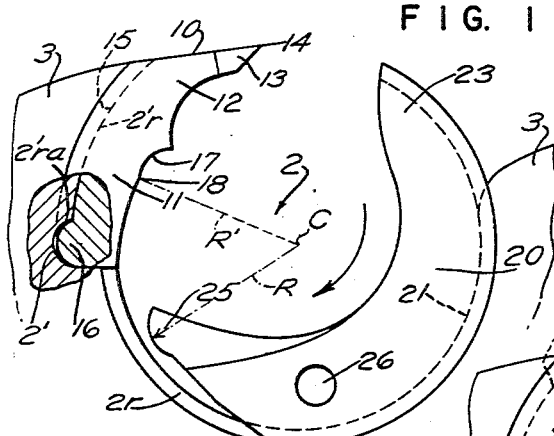
Figure 4:
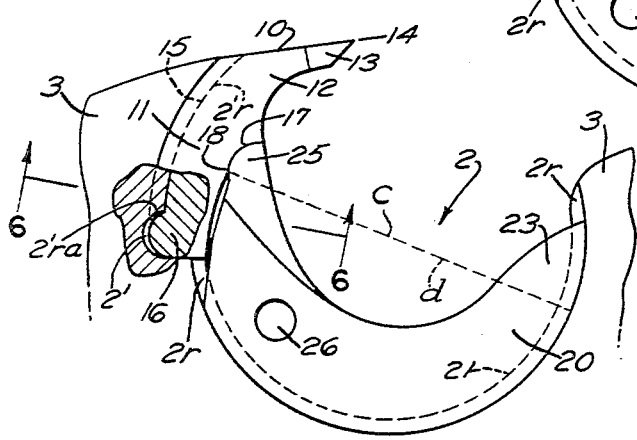

By reference to Figs. 2 and 4 it is apparent that the bits 10 as here illustrated and described may readily be set into the corresponding bit-receiving portions 2′ of the sockets 2 as an initial step in the installation of the insert pair. The rear-wall V-groove 15 of the bit conformantly receives the rib portion 2′r. The non-projecting but solid boss 16 at the foot of the bit leg 11 positively enters the space inwardly below said rib portion 2′r. It there stands in upward abuttive relation with the overlying transverse terminal wall or shoulder 2′ra of the rib.

Turning now to the other elements of the insert pairs, namely the locking shanks 20, each of these is a one-piece crescentic body shaped and proportioned for rotative sliding reception in the main portions of the saw plate sockets 2. The convex margin of each shank 20 is formed with the V-groove 21 previously mentioned for guiding interlock with the main rib 2r of the sockets. The opposite or concave margin of the shank 20 is of a generally semi-circular contour such as to provide with the forward portion of the bit 10 a well-formed roomy gullet. At the forward end the concave edge of the shank 20 is reversely curved toward the convex margin forming a terminal heel 23. At the other or rear end the shank terminates in a locking toe 25 having a rearwardly projecting arcuate and non-grooved wall. This shank toe 25 is angularly related to the generally opposite shank heel 23 so that both lie upon the same side of a diameter drawn through the center C of the plate socket and of the convex edge of the shank. Thus the crescentic body of the shank 20 extends over something more than 180° of arc; see diameter d, Fig. 4.

Considering again the bit elements 10 of the insert pairs, and noting especially Figs. 2, 5 and 7, the forward edge of each bit 10 has formed at an intermediate location a toe-receiving locking recess 17 formed upon a curve conformant to that of the toe 25. This recess is disposed preferably at least mid-way from the bottom of the bit leg 11 toward the bit head 12, so as to afford thrusting support for the bit 10 at a location well up toward the cutting tip 13, 14 thereof.

The lower end of the recess 17 on the front wall of the bit 10 is defined by a ridge or forward bulge 18 which below the recess 17 tapers gradually rearward in the direction proceeding toward the lower or inner end of the bit leg 11. The peak of this rise 18 constitutes also the lower lip of the recess 17, the defining wall of which recedes from the peak 18 somewhat more sharply than does the described inclined portion of the rise below the peak 18, the radius of curvature for the recess 17 being smaller than for the front wall of the bit leg below and leading up to the peak 18. As already noted the curvature of the recess 17 conforms to that of the shank toe 25.

Figure 3:
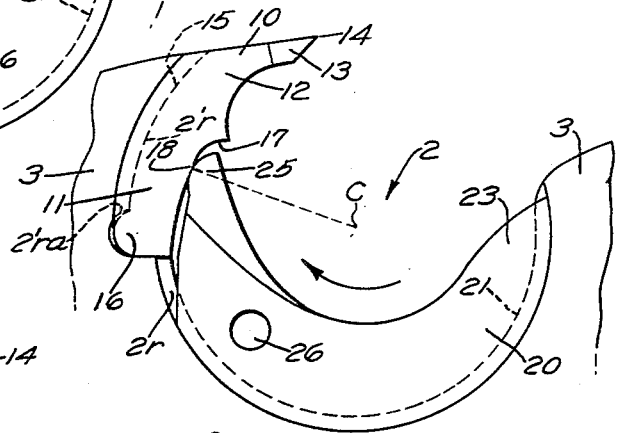

Referring more particularly to Figs. 2 and 4, the bits 10 and shanks 20 are shaped and proportioned relative to each other and to the receiving sockets 2, 2' of the saw plate so that a radius R, Fig. 2, from the center C of the socket and of the shank to a central point of the toe 25 is somewhat greater in length, in the free status of the shank, than a radius R' from said center C to the described peak 18 at the front edge of a bit 10 when seated in its receiving socket portion 2'. Thus in turning a shank 20 in a socket 2 in clockwise direction as indicated in Fig. 3, after installation of the corresponding bit as shown in Fig. 2, it is apparent that the heel and toe portions 23, 25 of the shank must yield compressively toward each other in order for the toe to pass the bit peak 18 and enter the locking recess 17. In the course of such turning action, accomplished by insertion of a bar wrench at the hole 26 provided therefor on the shank body, the shank toe 25 in effect rides up over the bit ridge or peak 18. The on-center position, that of maximum resilient compression of the shank 20, is represented in Fig. 3, while in Fig. 4 the parts are shown with the shank 20 "across center" and full rotated into locking coaction with the bit, with the compressive stress on the shank reduced. In this completely installed position the shank toe 25 seats itself in the recess 17 under the reverse expansive action of the shank upon the at least partial release of the compressive stress thereon after the toe has passed the ridge 18.

By reference particularly to Fig. 4 and comparison with Figs. 2 and 3, it is evident that a positive in-locking of the bit 10 is accomplished by the illustrated abuttive interengagement of the boss 16 at the lower end of the rear wall of the bit with the shoulder 2'ra on the saw plate 1. Thus it is impossible for the bit to move radially outward with respect to the saw plate. This direct metal to metal engagement between the bit boss 16 and the plate shoulder 2'ra is maintained during installation of the parts since as the toe 25 of the shank moves upwardly and outwardly toward the bit through the steps represented in Figs. 2 and 3 there is exerted upon the bit a holding pressure having both rearward and outward components. Further, with the bit and shank pair once installed as in Fig. 4, it is impossible for the bit to move relative to the saw plate without first re-compressing the shank from its "across center" installed position of Fig. 4 sufficiently to withdraw the shank toe 25 from the recess 17 and down over the peak 18.

In accordance with the invention and in contrast with usual prior practice the bits 10 under the described method of installation are first set into their receiving portions of the socket and thereafter the corresponding shanks 20 of each insert pair are placed in the front and bottom portions of the sockets, with the ribs of the latter in the shank grooves. The shanks then are rotated about the socket centers in a direction from the front toward the rear of the sockets, clockwise upon Figs. 1 to 4 of the drawings, noting the arrow on Fig. 3. The shanks in effect ride up over the legs of the bits and into locking installed position.

This contrast with the general prior practice is readily apparent from a comparison of Figs. 1 to 7 with a standard installation such as a Simonds Inserted Tooth Head Saw as shown in Fig. 8. There the hold-down for the bit B is at interengaged notch and nubbin portions of the insert pieces themselves, as at I, rather than directly between the bit B and the solid metal of the saw plate P. Further, the installation in the standard instance of Fig. 8 is by placing the bits B and shanks S simultaneously into the socket and turning them both together in the direction from the rear toward the front of the sockets, counter-clockwise in Fig. 8 as indicated by the arrow thereon, the bit being drawn down as the shank is rotated.

In such installation of standard style bits and shanks, as typified in Fig. 8, both the bit and shank must be forcibly turned in the saw plate socket through a substantial angle and while subject to compression in the general direction across the shank heel and toe. Hence there is wearage on the saw plate along much of the V-ribbed margin of the plate socket during the drawing in of the bit. By contrast, under the present invention, wherein the new style bit 10 is first placed in its seat on the plate, all wear on the plate due to drawing in of the bit under pressure is eliminated. With the bits 10 thus pre-seated the shanks 20 may be turned relatively freely. They are under comparable compression, if at all, only at or near the "center-crossing" position represented in Fig. 3. The resultant reduction in wear attendant on insertion and removal of the bits and shanks insures firm retention of the parts over a longer work period and extends the life of the saw plate.

From the foregoing in connection with the drawings it will be apparent that under the method of the invention and the improved construction of the bits and relation thereof to the shanks and to the saw plates the bits are installed with extreme accuracy and positive assurance of correct reception in the bit seating portions of the sockets. The at least partial release of compression upon the shank is readily observed by the person doing the installing, in progressing from the Fig. 3 position to that of Fig. 4. Thus definite notification is had that the bit is fully locked in place and the installation accurately completed.

It will be understood that my invention, either as to method or devices is not limited to the exemplary embodiments or steps herein illustrated or described, and I set forth its scope in my following claims:

I claim:

1. A tooth bit for a saw of the inserted tooth class, comprising an elongate arcuate metal piece having a leg and a head with a cutter tip thereon, the leg having planar side faces and having rear and front transverse walls, the rear wall of the leg continuously from the outer peripheral edge of the head to near the leg bottom end being formed as a segment of a circle and having a guide and aligning groove from the head to near said leg bottom end, a solid boss at the lower end of the groove defining a transverse terminal wall thereof and presenting an up-facing abutment substantially within the rear contour of the bit, the front wall of the bit leg being transversely continuous and at approximate right angles to the bit side faces and having at a longitudinal medial region an arcuate forwardly-open recess spaced substantially from the lower end of said front wall, the lower end of said medial recess defining the peak of a ridge projecting forwardly of and merging rearwardly and downwardly into said lower front wall of the bit leg.

2. A tooth bit for a saw of the inserted tooth class according to claim 1, wherein the lower front wall of the bit inclines gradually forward from the lower end of the bit to said ridge peak and eccentrically to the rear wall of the bit.

3. In a saw of the inserted tooth class, in combination, a saw body having a plurality of insert-receiving sockets with peripheral V-shaped rib formations, a like number of insert pairs each comprising a bit consisting of an elongate arcuate metal piece having a cutter tip, a grooved rear wall and a front wall, said rear wall being arcuate continuously from the outer to near the inner end of the bit a transverse abutment in the groove at the lower end of the rear wall, and a forward incline in the front wall together with a locking recess in said bit front wall, said incline leading up to said locking recess, the saw body having the rib formation for the bit seating portion of each socket conformant to the bit groove and terminating in a down-facing shoulder to engage over said bit abutment, the insert pairs further comprising each a shank marginally grooved conformantly to the remainder of the peripheral rib formation of each socket and having a forward heel and a rear toe adapted to ride compressively up over the forward incline of the seated bit and into holding engagement in the locking recess of the bit.

References Cited in the file of this patent
UNITED STATES PATENTS

| | | | |
|---|---|---|---|
| 248,761 | Krieger | Oct. 25, | 1881 |
| 532,371 | Goulding | Jan. 8, | 1895 |
| 542,577 | Walter | July 9, | 1895 |
| 1,140,021 | Brown | May 18, | 1915 |
| 1,536,783 | Freas et al. | May 5, | 1925 |
| 1,775,361 | Bevis | Sept. 9, | 1930 |
| 1,831,705 | Freas | Nov. 10, | 1931 |
| 2,117,147 | Charlton | May 10, | 1938 |